United States Patent
Toothaker et al.

(10) Patent No.: US 9,491,967 B2
(45) Date of Patent: Nov. 15, 2016

(54) APPARATUS AND METHOD FOR BATTERING AND BREADING FOOD ITEMS

(71) Applicants: Clifton Robert Toothaker, Statesville, NC (US); David Robert Haire, Connelly Springs, NC (US)

(72) Inventors: Clifton Robert Toothaker, Statesville, NC (US); David Robert Haire, Connelly Springs, NC (US)

(73) Assignee: Charley Biggs Food Company, Noblesville, IN (US)

( * ) Notice: Subject to any disclaimer, the term of this patent is extended or adjusted under 35 U.S.C. 154(b) by 226 days.

(21) Appl. No.: 13/875,738

(22) Filed: May 2, 2013

(65) Prior Publication Data

US 2013/0291789 A1 Nov. 7, 2013

Related U.S. Application Data

(60) Provisional application No. 61/641,593, filed on May 2, 2012.

(51) Int. Cl.
 *A23P 1/08* (2006.01)
 *B05C 3/09* (2006.01)

(52) U.S. Cl.
 CPC ............... *A23P 1/082* (2013.01); *A23P 1/081* (2013.01); *B05C 3/09* (2013.01)

(58) Field of Classification Search
 None
 See application file for complete search history.

(56) References Cited

U.S. PATENT DOCUMENTS

| | | | | |
|---|---|---|---|---|
| 3,924,100 A | * | 12/1975 | Mack et al. | 219/386 |
| 6,505,547 B1 | * | 1/2003 | Burnett et al. | 99/494 |
| 8,065,974 B1 | * | 11/2011 | Rome | 118/13 |

* cited by examiner

*Primary Examiner* — Dah-Wei D Yuan
*Assistant Examiner* — Jethro M Pence
(74) *Attorney, Agent, or Firm* — Ice Miller LLP

(57) ABSTRACT

Apparatuses and methods for battering and breading food items are disclosed. A cart is provided with a shelf including a hole for receiving a batter dip bucket and a hole for receiving a breading pan. A batter basket is disposed within the batter dip bucket.

8 Claims, 5 Drawing Sheets

APPARATUS AND METHOD FOR BATTERING AND BREADING FOOD ITEMS

CROSS-REFERENCE TO RELATED APPLICATIONS

This U.S. utility patent application claims the priority benefit of U.S. Provisional Patent Application Ser. No. 61/641,593, filed May 2, 2012.

TECHNICAL FIELD OF THE DISCLOSED EMBODIMENTS

The present disclosure generally relates food preparation devices and, more particularly, to an apparatus and method for battering and breading food items.

BACKGROUND OF THE DISCLOSED EMBODIMENTS

There are known in the art food preparation units, such as those used in commercial kitchens, that are designed to facilitate the battering and breading of food items, such as chicken, fish or other foods. One such prior art piece of equipment is known as a bread and batter table, an example of which is illustrated in FIG. 1 and indicated generally at 10. Bread and batter table 10 includes a cabinet 11 that contains several components of the bread and batter table 10. For example, bread and batter table 10 includes within the cabinet 11 a batter dip pan 12 in which is removably disposed a batter basket 14. Batter to be applied to the food items may be poured into the batter dip pan 12. The batter basket 14 is mounted to a spring assembly that lifts the batter basket 14 above the level of the batter in the batter dip pan 12 when the spring assembly is in its quiescent state.

The bread and batter table 10 additionally includes a breading pan 16. Breading material is placed into the breading pan 16. Breading pan 16 includes a removable plug (not visible in FIG. 1) in the bottom thereof. Situated below breading pan 16 is a sifting drawer 18 that slides from a first position where it is disposed under the breading pan 16, to a second position where it is disposed external to the cabinet 11 and may be removed therefrom. Situated still further below the sifting drawer 18 is a sifted breading lug 20. Sifted breading lug 20 also slides from a first position where it is disposed under the sifting drawer 18, to a second position where it is disposed external to the cabinet 11 and may be removed therefrom. A guard 22 is in some devices positioned above the batter dip pan 12 to prevent foreign objects from falling into the batter contained therein.

In operation, batter is placed into the batter dip pan 12 and breading material is placed into the breading pan 16. Typically, approximately three gallons of batter are placed into the batter dip pan 12. One or more food items that are to be battered and breaded are placed into the batter basket 14 and the batter basket 14 is pushed downward against the spring force of the spring assembly until the food items are immersed into the batter. Release of the downward pressure on the batter basket 14 causes the springs of the spring assembly to raise the batter basket 14 back to the raised position such that the food items are raised out of the batter. The batter basket 14 is hinged so that the operator can swing the batter basket 14 forward to dump the food items from the batter basket 14 into the breading pan 16. The food items and/or the breading are manipulated by the operator until the breading substantially coats the food items (the breading will stick to the food items because of the batter that already coats them). Once breaded, the food items may be removed from the breading pan 16 and placed into another container (not shown) awaiting cooking. The container for receiving the battered and breaded food items is typically held on the shelf 21, which folds and may be placed in either a horizontal orientation (shown) or a vertical orientation for storage. This folding shelf is not very sturdy, and incidents of the shelf breaking and becoming unusable are not uncommon.

It will be appreciated that the act of breading the food items is imprecise, and some of the batter will detach from the food items and remain in the breading pan 16 after the food items have been removed. When enough detached batter has built up in the breading, or when it is desired to change the breading formulation in the breading pan 16 to prepare a different type of food item, the plug in the bottom of breading pan 16 is removed and the breading in breading pan 16 is pushed through the resulting hole, where it will fall into the sifting drawer 18. Breading that is not clinging to detached batter will easily pass through the sifting drawer 18 and fall into the sifted breading lug 20, while the larger pieces of combined batter and breading will be trapped in the sifting drawer 18 (and may thereafter be disposed of). The cleaned breading in the sifted breading lug 20 may then be placed back into the breading pan 16 (after the plug has been replaced) if the same breading formulation is to be used to bread further food items, or it may be stored for later use.

It will be appreciated then that there remains a need in the art for improvements in existing systems and methods for battering and breading food items. The presently disclosed embodiments are directed to satisfying this need.

SUMMARY OF THE DISCLOSED EMBODIMENTS

In one embodiment, an apparatus for battering and breading food items is disclosed, comprising: a cart, comprising: a bottom shelf including a clean-out plug formed therethrough; a plurality of legs coupled to the bottom shelf; a top shelf coupled to the plurality of legs and supported thereby above the bottom shelf, the top shelf including: a marine edge formed therearound; a circular hole formed therethrough and having a diameter of less than approximately 14 inches; and a rectangular hole formed therethrough and having an area of less than approximately 230 square inches; a plurality of casters operatively coupled to the bottom shelf; at least one handle; and a recess formed in at least one of the at least one handles; a quantity of disposable gloves disposed in the recess; a circular batter dip bucket disposed in the circular hole; a circular batter dip basket disposed in the batter dip bucket; a rectangular breading pan disposed in the rectangular hole; and a staging pan disposed on the top shelf.

In another embodiment, an apparatus for battering and breading food items is disclosed, comprising: a cart, comprising: a bottom shelf; a plurality of legs coupled to the bottom shelf; a top shelf coupled to the plurality of legs and supported thereby above the bottom shelf, the top shelf including: a circular hole formed therethrough and having a diameter of less than approximately 14 inches; and a rectangular hole formed therethrough and having an area of less than approximately 230 square inches; a plurality of casters operatively coupled to the bottom shelf; at least one handle; and a circular batter dip bucket disposed in the circular hole; a circular batter dip basket disposed in the batter dip bucket;

and a rectangular breading pan disposed in the rectangular hole.

Other embodiments are also disclosed.

DETAILED DESCRIPTION OF THE DISCLOSED EMBODIMENTS

Figure 1:
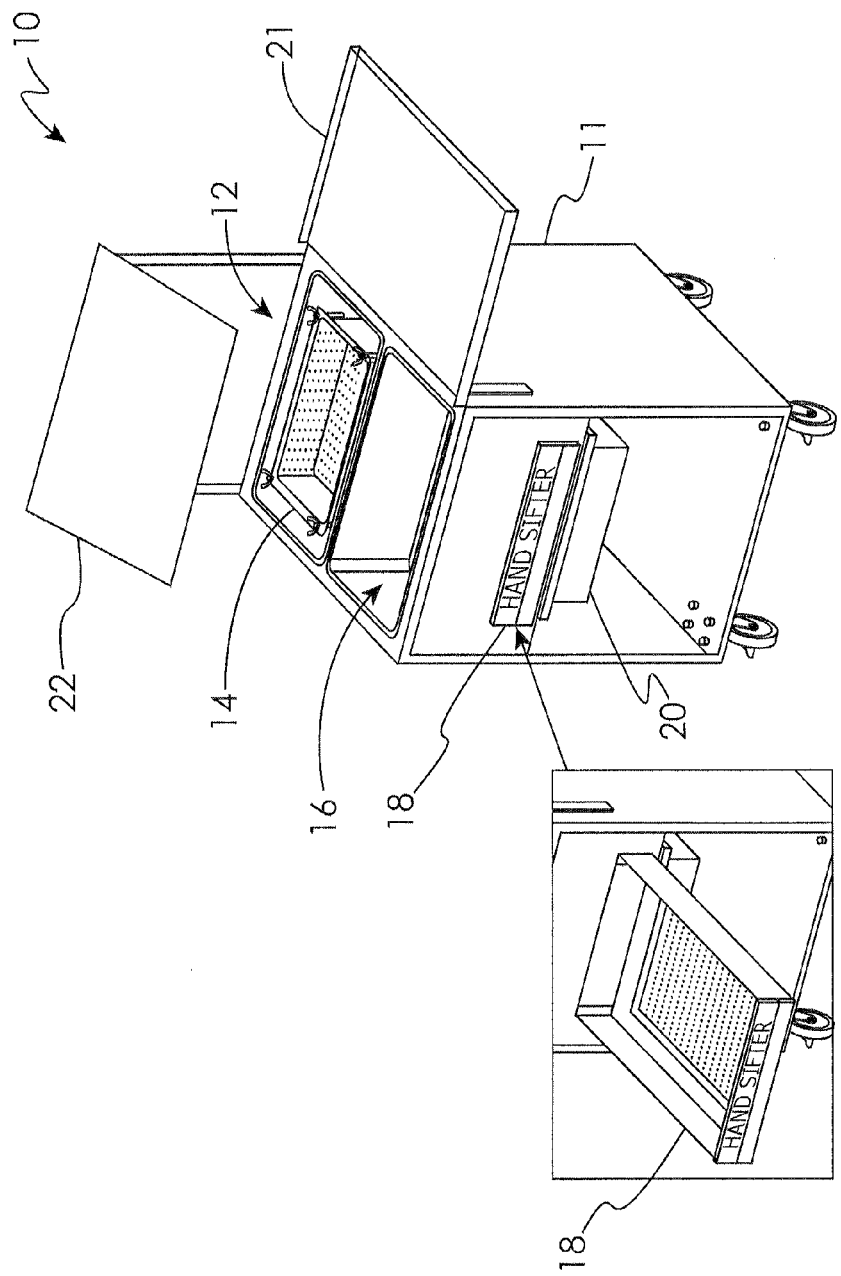
FIG. 1 is a perspective view of a prior art bread and batter table.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the disclosure, reference will now be made to the embodiment illustrated in the drawings, and specific language will be used to describe that embodiment. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

The presently disclosed embodiments provide apparatuses and methods for battering and breading food items that include several improvements over prior art designs.

Figure 2:
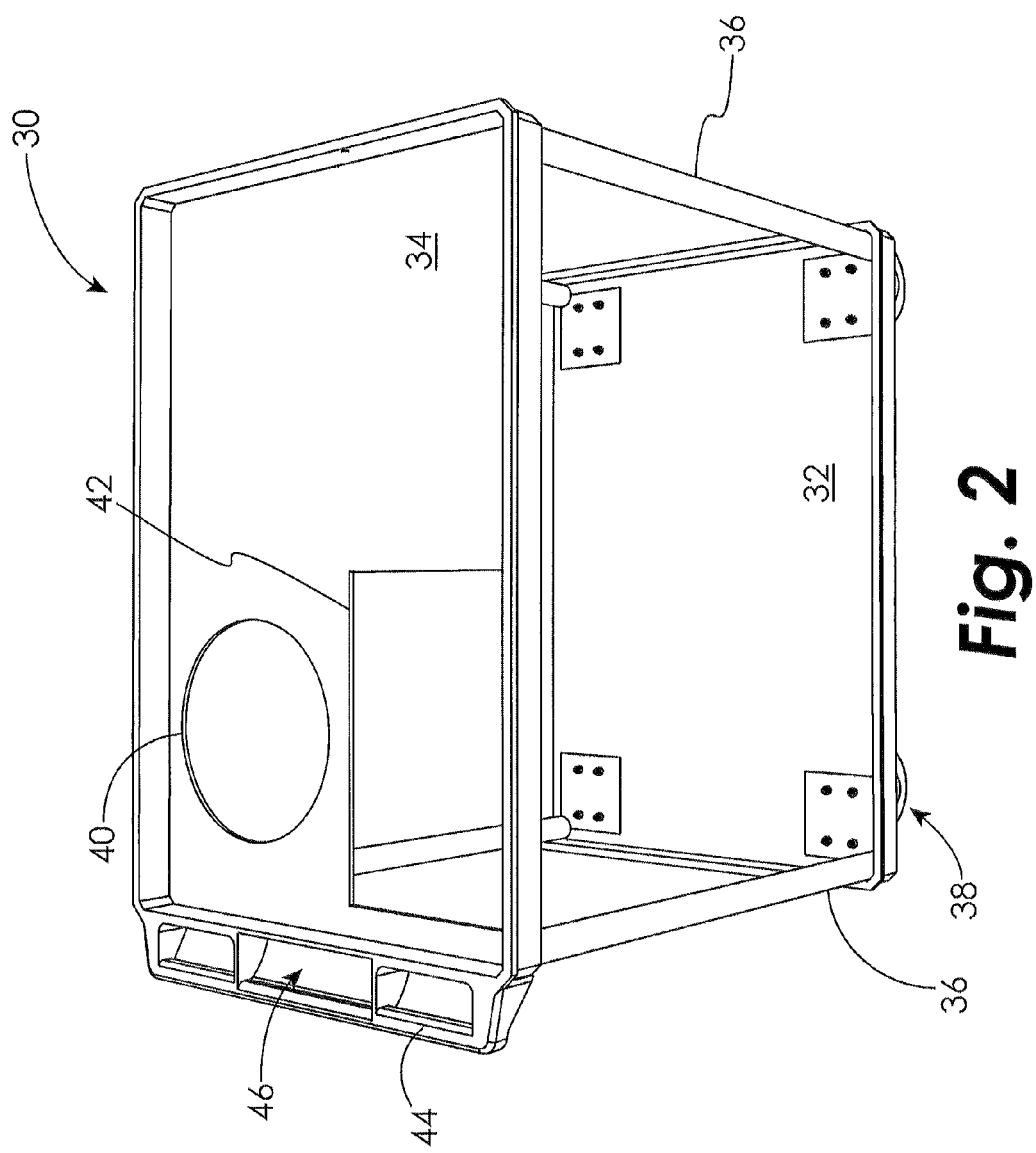
FIG. 2 is a perspective view of a bread and batter cart according to an embodiment.

A first embodiment movable cart for implementing a bread and batter table according to the present disclosure is illustrated in FIG. 2 and indicated generally at 30. In the first embodiment, the cart 30 is constructed from stainless steel. Those skilled in the art will recognize that the cart 30 may be made from any appropriate material. The cart 30 includes a bottom shelf 32 and a top shelf 34 supported above the bottom shelf 32 by means of a plurality of legs 36. Each corner of the cart 30 may be supported by a wheel 38, such as a caster, to allow the cart 30 to be movable and positionable at various locations within a kitchen. In some embodiments, the wheels 38 comprise five inch grease resistant locking casters. The bottom shelf 32 may include a clean-out plug (not shown) therein to assist in cleaning by draining any cleaning fluids placed onto the bottom shelf 32. Cleaning is also facilitated by the provision of a marine (no drip) edge on all sides of the top shelf 34.

In one embodiment, top shelf 34 may include a circular hole 40 formed therethrough for receipt of a batter dip bucket (described hereinbelow). In some embodiments, the hole 40 is less than approximately 14 inches in diameter. In other embodiments, the hole 40 is less than approximately 13 inches in diameter. In yet other embodiments, the hole 40 is less than approximately 12 inches in diameter. In still other embodiments, the hole 40 is approximately 11⅜ inches in diameter.

Figure 6:
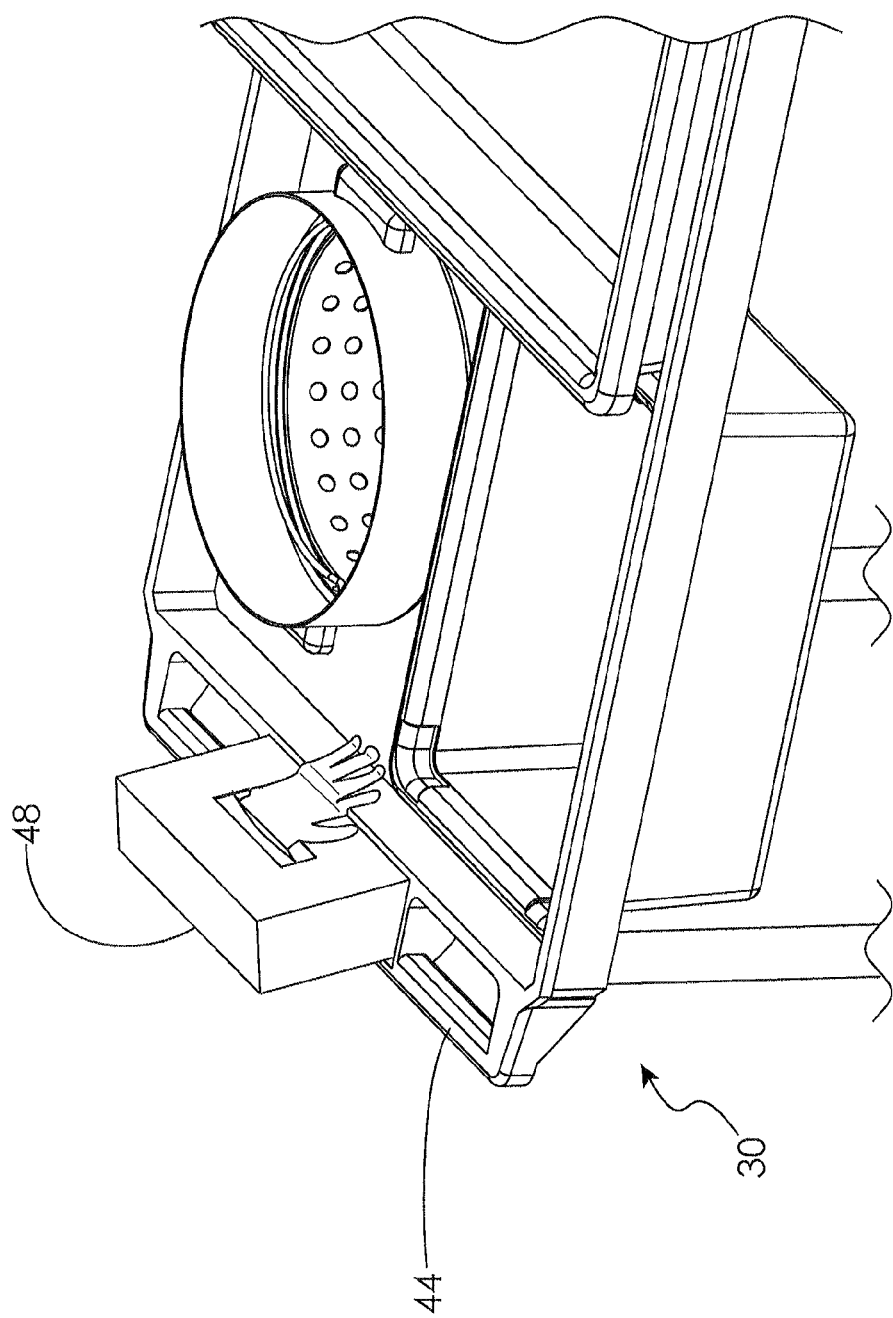
FIG. 6 is a perspective view of a portion of the bread and batter cart of FIG. 2, illustrating a recess for storing a box of disposable gloves therein.

Top shelf 34 may additionally include a rectangular hole 42 formed therethrough for receipt of a breading pan (described hereinbelow). In some embodiments, the hole 42 has an area of less than approximately 230 square inches. In other embodiments, the hole 42 has an area of less than approximately 220 square inches. In yet other embodiments, the hole 42 has an area of less than approximately 210 square inches. In still other embodiments, the hole 42 has an area of approximately 204 square inches. In some embodiments, top shelf 34 is sized so as to provide an area adjacent the holes 40 and 42 sized to accommodate a staging pan to receive the battered and breaded food items. In the illustrated embodiment, an 18"×26" staging pan (such as a model 18263P food storage box, available from the Cambro Manufacturing Company, 5801 Skylab Road, Huntington Beach, Calif. 92647) may be accommodated on the top shelf 34. The cart 30 may include a handle 44 for ease in manipulating the cart 30. The handle 44 may be located on any side of the cart 30, and multiple handles 44 may be provided on multiple sides of the cart 30 in some embodiments. In some embodiments, a recess 46 is provided for storing disposable gloves, such as a box of disposable gloves 48 (see FIG. 6), that may be used by the operator when handling the food items.

Figure 3:
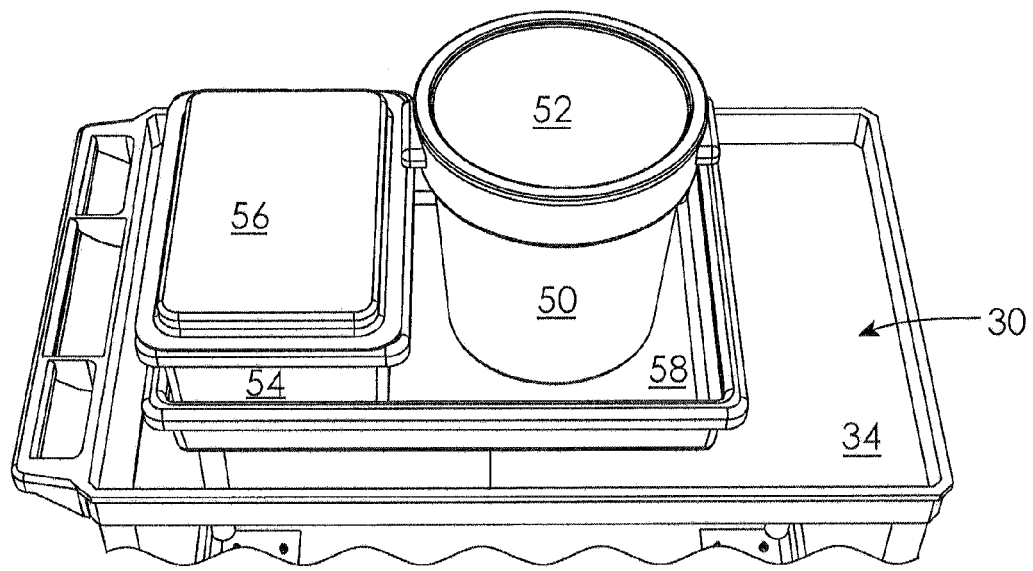
FIG. 3 is a perspective view of several containers used with the bread and batter cart of FIG. 2.

Referring now to FIG. 3, there are shown various containers that may be used with the cart 30 in some embodiments. A circular batter dip bucket 50 (such as a model RFS-18 round food storage container, available from the Cambro Manufacturing Company, 5801 Skylab Road, Huntington Beach, Calif. 92647) may be used to hold batter for dipping. A lid 52 (such as a model RFSC12148 round food storage container lid, available from the Cambro Manufacturing Company, 5801 Skylab Road, Huntington Beach, Calif. 92647) may be provided such that the batter dip bucket 50 may be used to store batter therein between uses. The batter dip bucket 50 is sized to be received in the hole 40 of cart 30 without falling through the hole 40. A breading pan 54 (such as a model 121189P food storage container, available from the Cambro Manufacturing Company, 5801 Skylab Road, Huntington Beach, Calif. 92647) may be used to hold the breading. A lid 56 (such as a model 1218CP food storage container lid, available from the Cambro Manufacturing Company, 5801 Skylab Road, Huntington Beach, Calif. 92647) may be provided such that the breading pan 54 may be used to store breading therein between uses. The breading pan 54 is sized to be received in the hole 42 of cart 30 without falling through the hole 42. A staging pan 58 (such as a model 18263P food storage container, available from the Cambro Manufacturing Company, 5801 Skylab Road, Huntington Beach, Calif. 92647) may be used to hold the battered and breaded food items prior to cooking. The staging pan 58 is sized to be received on the top shelf 34 of cart 30.

Figure 4:
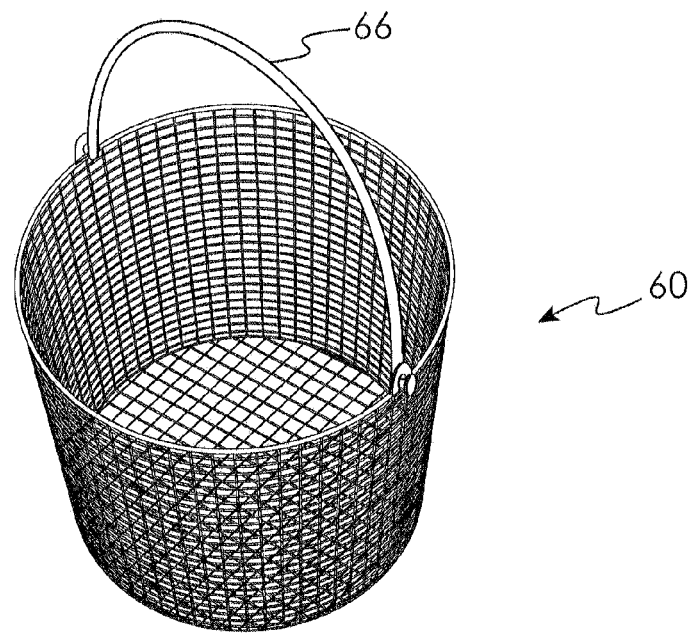
FIG. 4 is a perspective view of a batter dip basket used with the bread and batter cart of FIG. 2.

Referring now to FIG. 4, in some embodiments a batter dip basket, such as the batter dip basket indicated generally at 60, is used in conjunction with the batter dip bucket 50. The batter dip basket 60 is circular in shape and sized to fit within the batter dip bucket 50. Batter dip bucket 50 is formed from a wire mesh material in order to allow the batter within the batter dip bucket 50 to flow into the batter dip basket 60 when placed therein, and further to allow the batter to flow out of the batter dip basket 60 and into the batter dip bucket 50 when the batter dip basket 60 is removed therefrom. In other embodiments, at least a portion of the batter dip basket 60 is formed from a material that includes a plurality of holes formed therethrough rather than a mesh material (as shown in FIG. 4, for example). In order to facilitate removal of the batter dip basket 60 from the batter dip bucket 50, some embodiments provide a handle 66 that may be used for such purpose.

Figure 5:
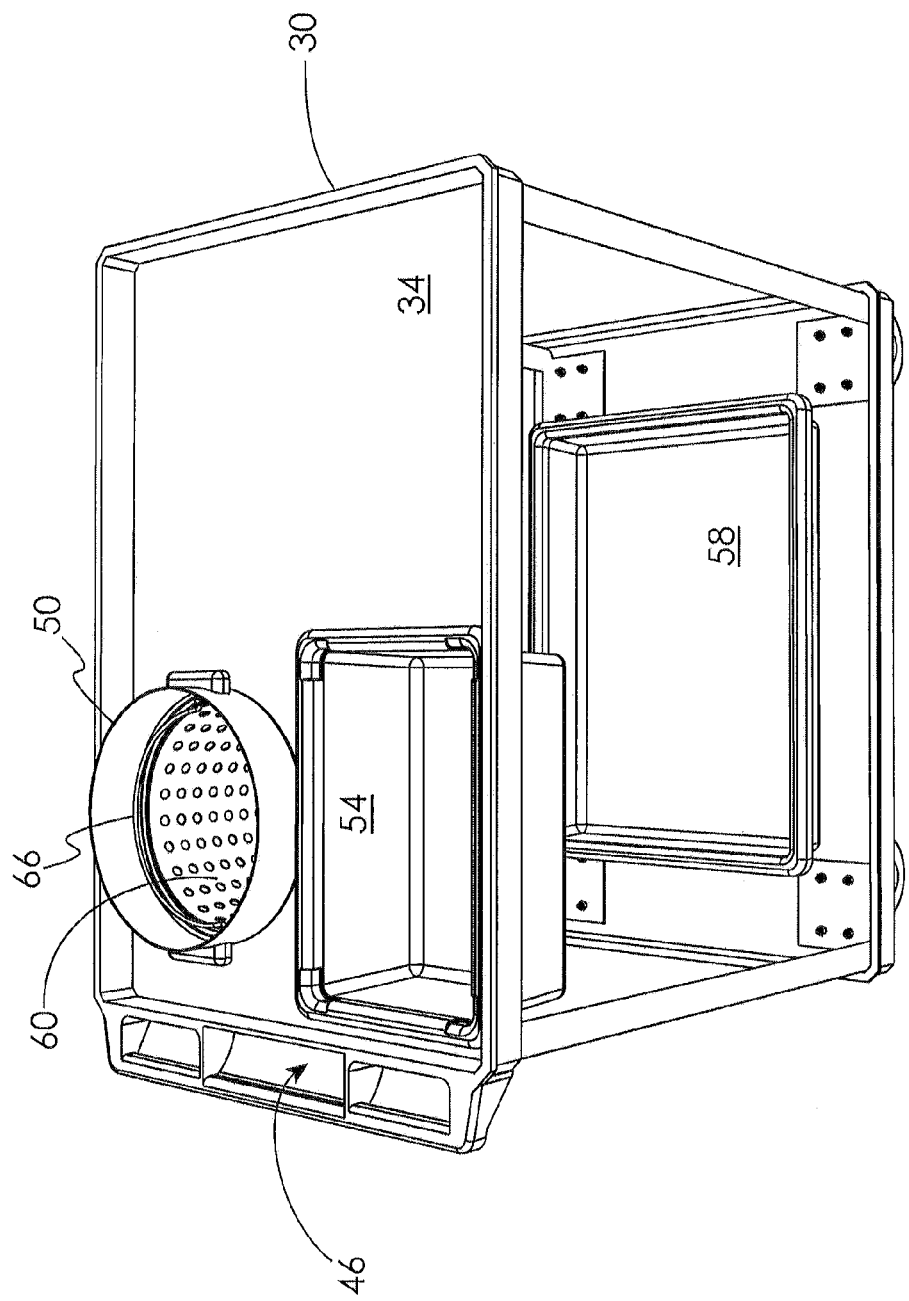
FIG. 5 is a perspective view of the bread and batter cart of FIG. 2 with the containers of FIG. 3 and the batter dip basket of FIG. 4 installed thereon.

FIG. 5 illustrates the cart 30 with the batter dip bucket 50 installed within the hole 40 in the top shelf 34. The batter dip basket 60 is installed within the batter dip bucket 50 such that the batter dip basket 60 rests on the bottom surface of the batter dip bucket 50. Also shown is the breading pan 54 installed in the opening 42 in the top shelf 34 of the cart 30.

In use, the cart 30 is wheeled to any convenient location where the battering and breading of the food items is to take place. Breading material is placed into the breading pan 54 and batter is poured into the batter dip bucket 50. In one embodiment, approximately one gallon of batter is poured into the batter dip bucket 50, as compared to the approximately three gallons of batter used in the prior art bread and batter table 10 of FIG. 1. This smaller amount of batter is easier for the operator to handle and encourages more frequent change out of the batter. Because the various embodiments of the batter dip bucket 50 have diameters in the ranges disclosed above, the depth of the batter in the batter dip bucket 50 when one gallon of batter is placed therein is still adequate to accommodate the same amount of food items as can be accommodated in the prior art batter dip pan 12 holding approximately three gallons of batter. If approximately one gallon of batter were poured into the prior art batter dip pan 12, the depth of the batter within the batter dip pan 12 would not be sufficient to accommodate the battering of food items by dipping them into the batter dip pan 12. Similarly, because the various embodiments of the breading pan 54 have cross-sectional openings in the ranges disclosed above, a smaller amount of breading may be placed into the breading pan 54 while still providing adequate depth to bread the battered food items placed therein. This eliminates the need for sifting the breading since the smaller amount of breading facilitates simply disposing of the compromised breading material and refilling with fresh breading material. This also facilitates changing of breading profiles. Both the breading pan 54 and the batter dip bucket 50 have corresponding lids so that excess material therein may be stored within the pans themselves for later use.

The batter dip basket 60 is then installed within the batter dip bucket 50. Food items are then placed within the batter dip bucket 50 or, alternatively, the food items are placed within the batter dip basket 60 prior to it being placed within the batter dip bucket 50. Once the food items are coated with batter, the batter dip basket 60 is lifted out of the batter dip bucket 50 by use of the handle 66 and the food items are dumped into the breading pan 54. The food items are manipulated in the breading material in the pan 54 and, once coated, they are placed into the staging pan 58. Because the cart 30 is mobile and the breading, batter dip and food items (such as chicken) are all contained in the same area, the chance for cross-contamination with other food items in the kitchen is greatly minimized.

Some embodiments of the cart 30 utilize stainless steel construction. The marine edge formed around the circumference facilitates cleaning, as does the drain area in the bottom shelf. The ability to easily sanitize the cart 30 (such as, for example, after preparing chicken) is a significant advantage of the presently disclosed embodiments, Also, the provision of a tray 46 to hold disposable gloves immediately adjacent the work surface additionally promotes proper sanitary practices.

What is claimed:

1. A battering and breading food items apparatus, comprising:
   a cart, comprising:
      a bottom shelf including a clean-out plug formed therethrough;
      a plurality of legs coupled to the bottom shelf;
      a top shelf coupled to the plurality of legs and supported thereby above the bottom shelf, the top shelf including:
         a marine edge formed therearound;
         a circular hole formed therethrough and having a diameter of less than 14 inches; and
         a rectangular hole formed therethrough and having an area of less than 230 square inches;
      a plurality of casters operatively coupled to the bottom shelf;
      at least one handle; and
      a recess formed in the at least one handle;
   a quantity of disposable gloves disposed in the recess;
   a circular batter dip bucket disposed in the circular hole;
   a circular batter dip basket disposed in the batter dip bucket;
   a rectangular breading pan disposed in the rectangular hole; and
   a staging pan disposed on the top shelf.

2. The apparatus of claim 1, wherein the circular hole diameter is less than 13 inches.

3. The apparatus of claim 1, wherein the circular hole diameter is less than 12 inches.

4. The apparatus of claim 1, wherein the circular hole diameter is 11⅜ inches.

5. The apparatus of claim 1, wherein the rectangular hole area is less than 220 square inches.

6. The apparatus of claim 1, wherein the rectangular hole area is less than 210 square inches.

7. The apparatus of claim 1, wherein the rectangular hole area is 204 square inches.

8. The apparatus of claim 1, wherein the batter dip basket is at least partially formed from wire mesh material.

\* \* \* \* \*